Inventor
Thomas F. Pearson.
Cushman, Darby & Cushman
Attorneys

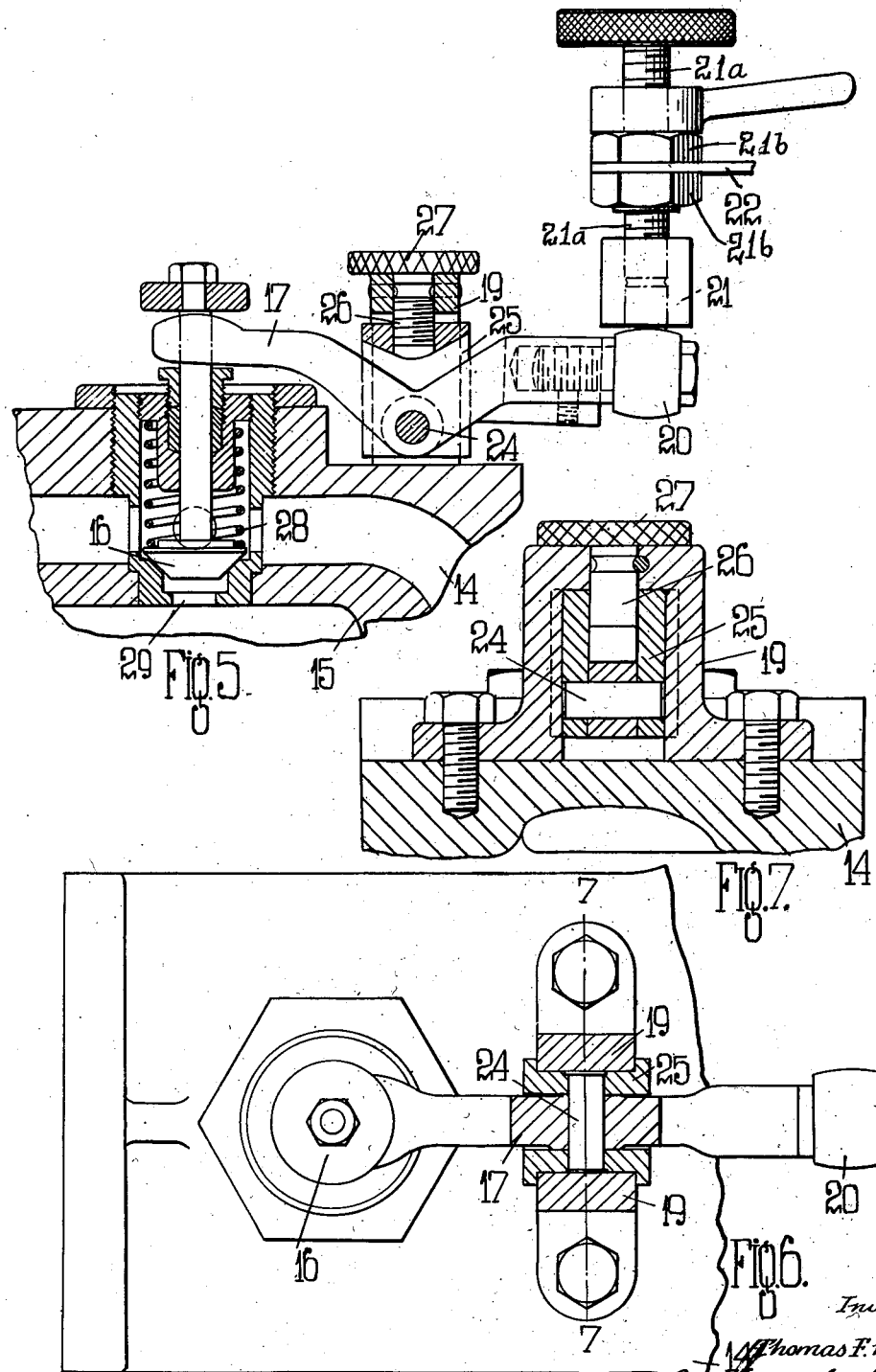

March 3, 1942.  T. F. PEARSON  2,275,231
FORMING MACHINE FOR HOLLOW GLASSWARE
Filed Sept. 7, 1937   5 Sheets-Sheet 5
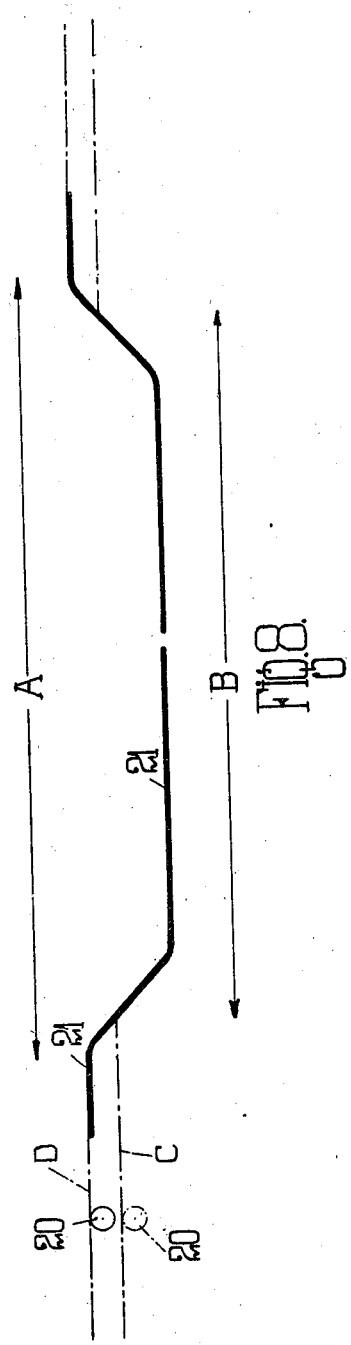
Inventor.
Thomas F. Pearson.
Attorneys Patented Mar. 3, 1942

2,275,231

UNITED STATES PATENT OFFICE 2,275,231

FORMING MACHINE FOR HOLLOW GLASSWARE

Thomas Finney Pearson, Pontefract, England, assignor to Crown Cork & Seal Company, Inc., New York, N. Y., a corporation of New York Application September 7, 1937, Serial No. 162,744
In Great Britain September 9, 1936

1 Claim. (Cl. 49—19)

The present invention relates to forming machines for hollow glassware, and has for its object the provision of means for varying the period and amount of valve opening for blowing glass charges in the separate moulds of a multiple mould machine.

In a multiple mould machine according to this invention each mould is provided with a valve which is adjustable independently of the others to vary its degree and period of opening on actuation by means common to all the valves when the separate moulds are displaced to a position about the frame at which the blowing operation is performed. The means common to all the valves for operating these in succession for permitting blowing of the charges in the moulds as they travel around the frame of the machine may be fixed, or again such means may be adjustable.

The invention is more particularly described with reference to the accompanying drawings, in which:

Figure 5 is a corresponding sectional view but showing the pivot of the operating lever of a valve in a lowered position for adjusting the extent and period of opening of said valve relatively to the remaining valves of the machine on actuation by the cam track.

Figure 6 is a plan view partly in section, of Figure 3.

Figure 7 is a sectional elevation on the line 7—7 of Figure 6.

Figure 8 is a diagrammatic representation illustrating the effect of adjustment of each valve lever pivot.

Figure 1:
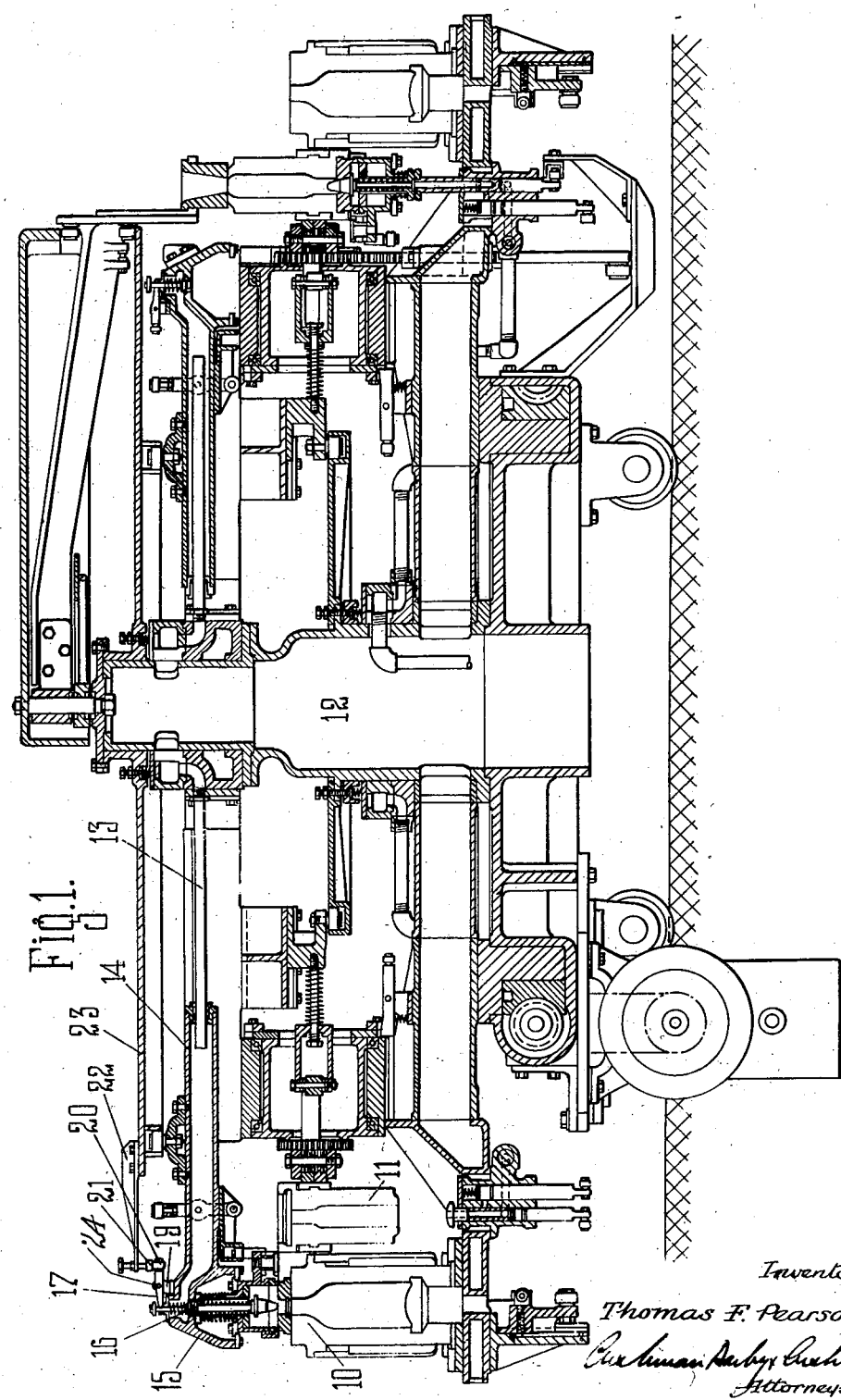
Figure 1 is a vertical section through a forming machine of a type to which the present invention is applicable.
Figure 2:
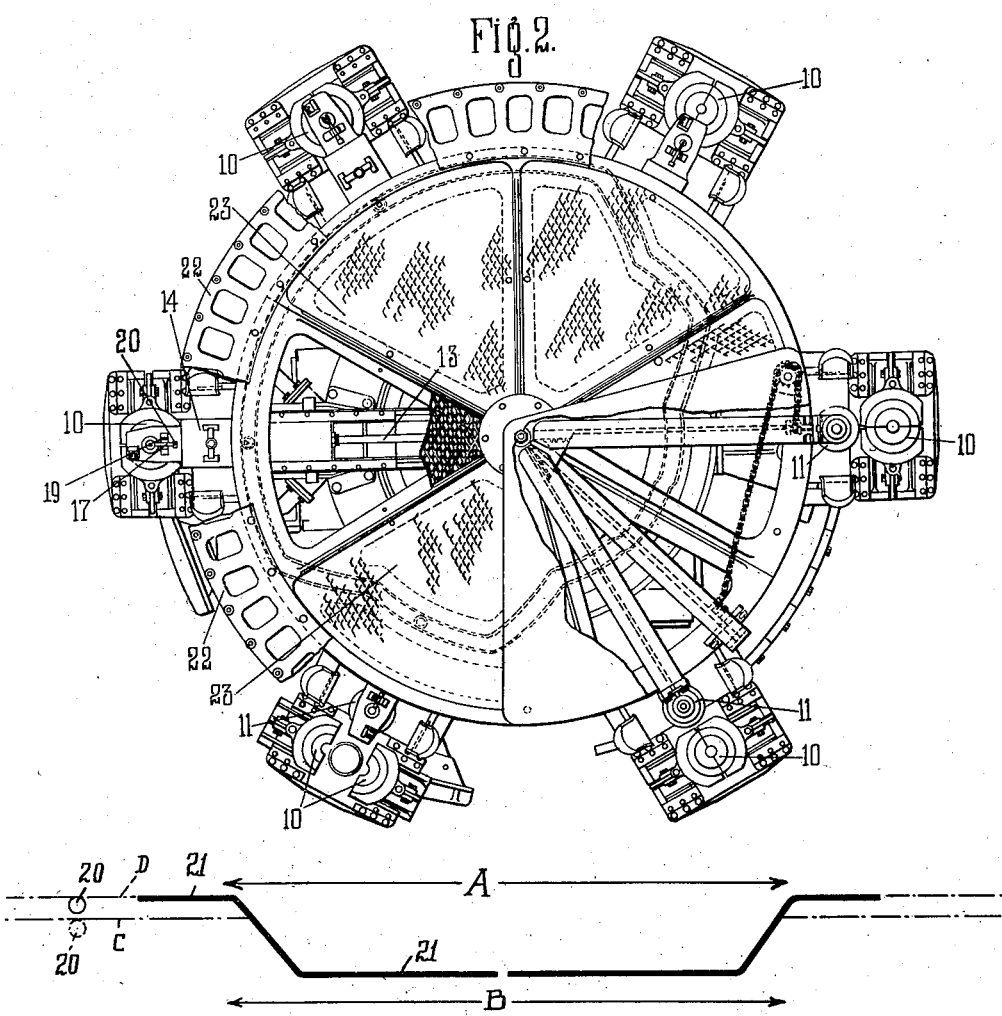
Figure 2 is a corresponding plan view.
Figure 3:
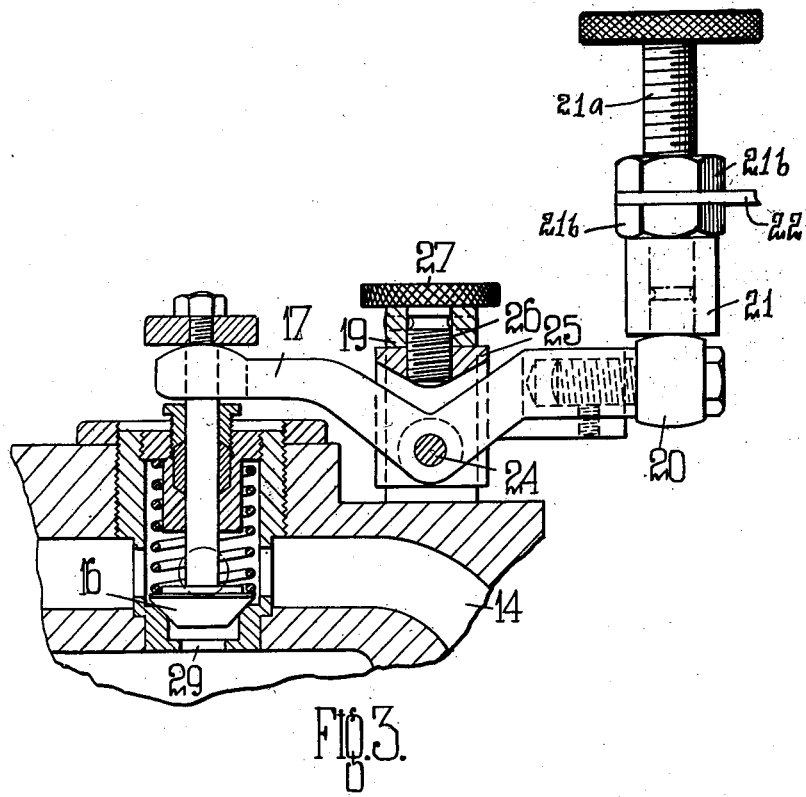
Figure 3 is a vertical section through a valve control means of the present invention showing a valve shut, i. e., the supply of blowing air is cut off from its mould, since the valve roller is not depressed by a cam track or other control means common to all the valves and their moulds.
Figure 4:
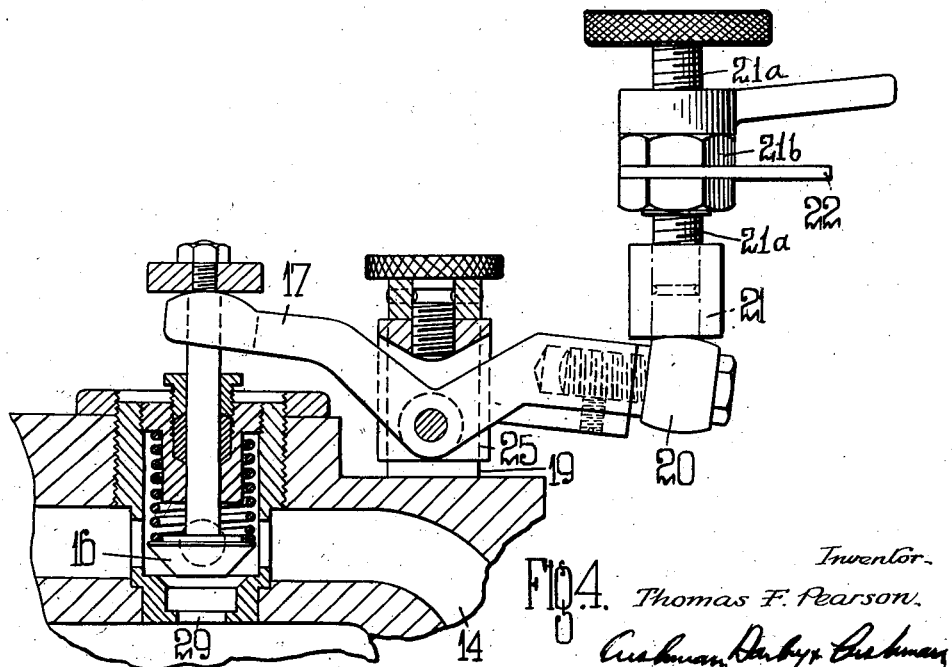
Figure 4 is a similar sectional view but with the valve open due to engagement of the roller by a cam track for opening the valves similarly and in succession.

In the drawings Figures 1 and 2 show a machine which is described in my patent application, Ser. No. 111,517, that is to say, it illustrates a continuously rotatable machine wherein a number of blow moulds 10 and a corresponding number of parison moulds 11 are revoluble in unison on a frame about a hollow column 12, charges of glass being picked up by the parison moulds in succession at one position of their revolution about the central column, whereupon the charges are partially blown in succession in the parison moulds, whereupon the charges at another part of the path of rotation are transferred in succession and in a direction radially of the machine to the corresponding blow moulds.

When a parison or partly blown charge is inserted within a blow mould a supply of blowing air is fed through a pipe 13 and a hollow arm 14, one for each blow mould, to a blow head 15, the said supply being controlled by a valve 16, the spindle of which is carried at one end of a lever 17 pivoted at 24 to a bracket 19 carried by the hollow member 14. The opposite end of each lever carries a roller 20 which is engaged by a cam track 21 suspended by spindles 21ª threaded in nuts 21ᵇ, carried by a plate 22 fixed to a stationary cover 23 of the machine, whereby the positions of different linked sections of the cam track may be adjusted vertically.

The contour of the cam track 21 is variable in the manner described in my patent applications, Ser. Nos. 111,517 and 120,075 the variation in the contour of the cam track resulting in variation of the duration of the supply of blowing air to all blow moulds 10 in succession, as they traverse their path of rotation about their common axis. It also varies the limits of the path of revolution of all blow moulds about their common axis during which blowing air is supplied, and the the volume and consequently the effective pressure of the blowing air, the latter being dependent on the degree by which the valves 16 in turn are lifted and this depends upon the extent of adjustment of the contour of the cam track below and relatively to the fixed support.

It will be appreciated that with the construction already described, variation of the contour of the cam track affects all the valves in a substantially similar manner.

By the present invention any one or more of the valves may be independently adjusted relatively to the others. To effect this result the lever 17 of each valve is pivoted at 24 to a block 25 which is substantially of H section and is slidably mounted in a bracket 19 carried by the hollow member 14 of the mould with which said valve is associated. Each block 25 is vertically adjustable within its bracket 19 and for this purpose it is internally screw threaded for engagement by the threaded end of a spindle 26 which is adapted to pass through the upper end of the bracket and carries a milled head 27. The spindle is prevented from longitudinal displacement within the bracket but on rotation of the milled head engages with the block 25 to a greater or smaller extent according to the direction of rotation in order to vary the height of the block relatively to the bracket and thus adjust the position of the pivot 24 carried by the block relatively to the arm 14.

In this way each valve 16 may be independently adjusted relatively to the remaining valves to suit variations in conditions applicable to the mould with which it is associated, such as for example, when one mould is cooler than the others and yet is required to produce a bottle or other hollow article of glassware similar to that of the remaining moulds, or again where a leakage may exist in the supply of blowing air to one mould which is non-existent in the others. In such latter event, for example, it would be necessary to open the valve 16 by a greater extent and possibly over a slightly longer period than that of opening of the remaining valves in order to produce uniformity of the articles of glassware blown in the different moulds. This would involve raising the pivot 24 of the valve lever concerned in relation to the others.

It will be appreciated that when adjusting the pivot 24 of each lever separately not only is the degree of opening of the corresponding valve varied as compared with the degree of opening of the other valves, despite the predetermined adjustment of the contour of the cam track common to all the valves, but in addition the period of valve opening is also varied, as on adjustment of any pivot 24 the roller of the lever 17 concerned is similarly adjusted relatively to the cam track and is thus engaged and disengaged by the cam track at different stages in the path of rotation of the moulds and their valves around the axis of the machine. This is diagrammatically illustrated in Figure 8.

When a pivot 24 of a valve lever 17 is in a high position represented by the roller 20 shown in full lines in this figure, the roller 20 during its movement in a horizontal circuitous path D engages with the cam track 21 to open the valve fully over a path represented by the span A, but when a pivot 24 of a valve lever is adjusted to a lower position shown in dotted lines in Figure 8, the said roller rotates about a lower horizontal circuitous path represented by the dotted line C, and not only is the valve opened by a smaller extent on engagement of the roller with the cam track due to a smaller pivotal displacement of the lever 17, but in addition the period during which the valve remains partially open is represented by the span B which is slightly smaller than that of the span A.

It will of course, be appreciated that the action of the cam track 21 on each roller 20 of the valve lever 17 is resisted by a spring 28 which normally tends to maintain the valve closed, both prior and subsequent to engagement by the cam track, to prevent passage of blowing air along the hollow arm 14 and through the port 29 into a blow head 15 and it is only when the came track depresses each roller 20 that its corresponding valve 16 is raised off its seat against the action of the spring 28.

I declare that what I claim is:

In combination, an air conduit mounted for translational movement along a circular path about a fixed axis, a stationary cam track concentric with the path of movement of the conduit, a valve in the conduit, a lever provided with a fulcrum, and having one end operatively connected to the valve and its other end disposed in cam following relation to said cam track, and means for adjustably supporting the fulcrum of the lever with respect to the conduit, said means comprising a bracket fixed to the conduit, a block vertically slidable with respect to the bracket, a vertically disposed spindle journalled in the bracket and restrained against axial movement with respect thereto, a threaded connection between the spindle and the block, whereby upon rotation of the spindle the block is raised or lowered, and a fulcrum pin for the lever carried by the block.

THOMAS FINNEY PEARSON.